United States Patent
Murrey et al.

(10) Patent No.: US 6,725,766 B2
(45) Date of Patent: Apr. 27, 2004

(54) INDEPENDENTLY POWERED KNOTTER AND NEEDLE DRIVE ARRANGEMENT FOR A LARGE RECTANGULAR BALER

(75) Inventors: Jeffrey Lee Murrey, Ottumwa, IA (US); Paul David Parker, Ottumwa, IA (US); David Vincent Rotole, Ottumwa, IA (US); Eric Ryan Lang, Donnellson, IA (US); Darin Ledru Roth, Ottumwa, IA (US); Joseph Eugene Story, Kirksville, MO (US)

(73) Assignee: Deere & Company, Moline, IL (US)

( * ) Notice: Subject to any disclaimer, the term of this patent is extended or adjusted under 35 U.S.C. 154(b) by 109 days.

(21) Appl. No.: 10/034,590

(22) Filed: Jan. 2, 2002

(65) Prior Publication Data

US 2003/0121423 A1 Jul. 3, 2003

(51) Int. Cl.[7] .................................................. B30B 9/30
(52) U.S. Cl. ................................ 100/8; 100/29; 100/32
(58) Field of Search ............................ 100/4, 8, 29, 31, 100/32

(56) References Cited

U.S. PATENT DOCUMENTS

| | | | | |
|---|---|---|---|---|
| 4,083,441 A | * | 4/1978 | Young | 192/28 |
| 4,108,062 A | | 8/1978 | White | 100/11 |
| 4,142,746 A | * | 3/1979 | White | 289/2 |
| 5,156,085 A | * | 10/1992 | Bossche | 100/4 |
| 5,782,175 A | * | 7/1998 | Schrag | 100/4 |
| 6,164,197 A | * | 12/2000 | Prellwitz | 100/20 |
| 6,318,250 B1 | * | 11/2001 | Arnould et al. | 100/4 |

FOREIGN PATENT DOCUMENTS

DE          947 268          8/1956

* cited by examiner

*Primary Examiner*—Allen Ostrager
*Assistant Examiner*—Shelley Self

(57) ABSTRACT

A drive arrangement for controlling the tying function of a large rectangular baler includes a knotter drive shaft having a drive member mounted on it for free rotation. A one-way clutch is connected between the drive member and the drive shaft for rotating the drive shaft only when the drive member is rotated in a first direction. The drive member has an elongate flexible element associated therewith and is driven in the first direction by retraction of an extensible and retractable hydraulic motor having its rod end coupled to one end of the flexible element, the other end of the flexible element being coupled to a spring that stores energy only when the hydraulic motor is retracted. At the end of the tying function, the hydraulic motor is extended to its beginning position, the loaded spring then taking up the slack in the flexible element and the one-way clutch then free-wheeling.

9 Claims, 1 Drawing Sheet

INDEPENDENTLY POWERED KNOTTER AND NEEDLE DRIVE ARRANGEMENT FOR A LARGE RECTANGULAR BALER

FIELD OF THE INVENTION

The present invention relates to large rectangular balers and more particularly relates to knotter and needle drive arrangements for such balers.

BACKGROUND OF THE INVENTION

The bales produced by large rectangular balers are bound by a plurality of transversely spaced loops of twine. In order to reduce the amount of twine which has to be pulled about the bale, and thus reduce the amount of frictional resistance required to be overcome in order to pull the twine, it is known to provide upper and lower sources of twine for producing the loops with the loops being tied together with two knots, one at each end of the bale. Two knots, one being at the upper front corner of a bale just completed and the other being at the upper rear corner of a bale just beginning to be formed, are tied during the same tying cycle.

An example of a baler having a knotting arrangement for producing two knots in each loop is disclosed in U.S. Pat. No. 4,108,062, issued on Aug. 22, 1978. In this patented structure, a knotter drive sprocket is continuously driven and is coupled so as to be connected to a knotter drive shaft by a one-way clutch that is intermittently actuated in response to a bale being completed. This drive arrangement is not completely satisfactory in that it is relatively complex and costly, and its speed of operation is dependent upon that of the drive for the plunger and/or pick-up.

SUMMARY OF THE INVENTION

According to the present invention there is provided an improved drive arrangement for the knotters of a baler for making large parallelepiped bales.

An object of the invention is to provide a knotter drive arrangement which is of a relatively simple, low cost design having independent and/or intermittent drive capabilities.

A more specific object of the invention is to provide a knotter drive arrangement which includes an independently powered, extensible motor that is coupled for causing rotation of a knotter drive shaft so as to effect one tying cycle through one stroke of the motor. In the preferred embodiment the motor is in the form of a hydraulic cylinder whose extension turns the knotter drive shaft slightly more than 360°.

Yet another object of the invention is to provide a knotter drive, as set forth in the immediately preceding object, that includes a one-way clutch for allowing the drive cylinder to be reset to its beginning position without effecting further rotation of the knotter drive shaft.

These and other objects of the invention will become apparent from a reading of the ensuing description together with the appended drawings.

DESCRIPTION OF THE PREFERRED EMBODIMENT

Figures 1, 2, 3:
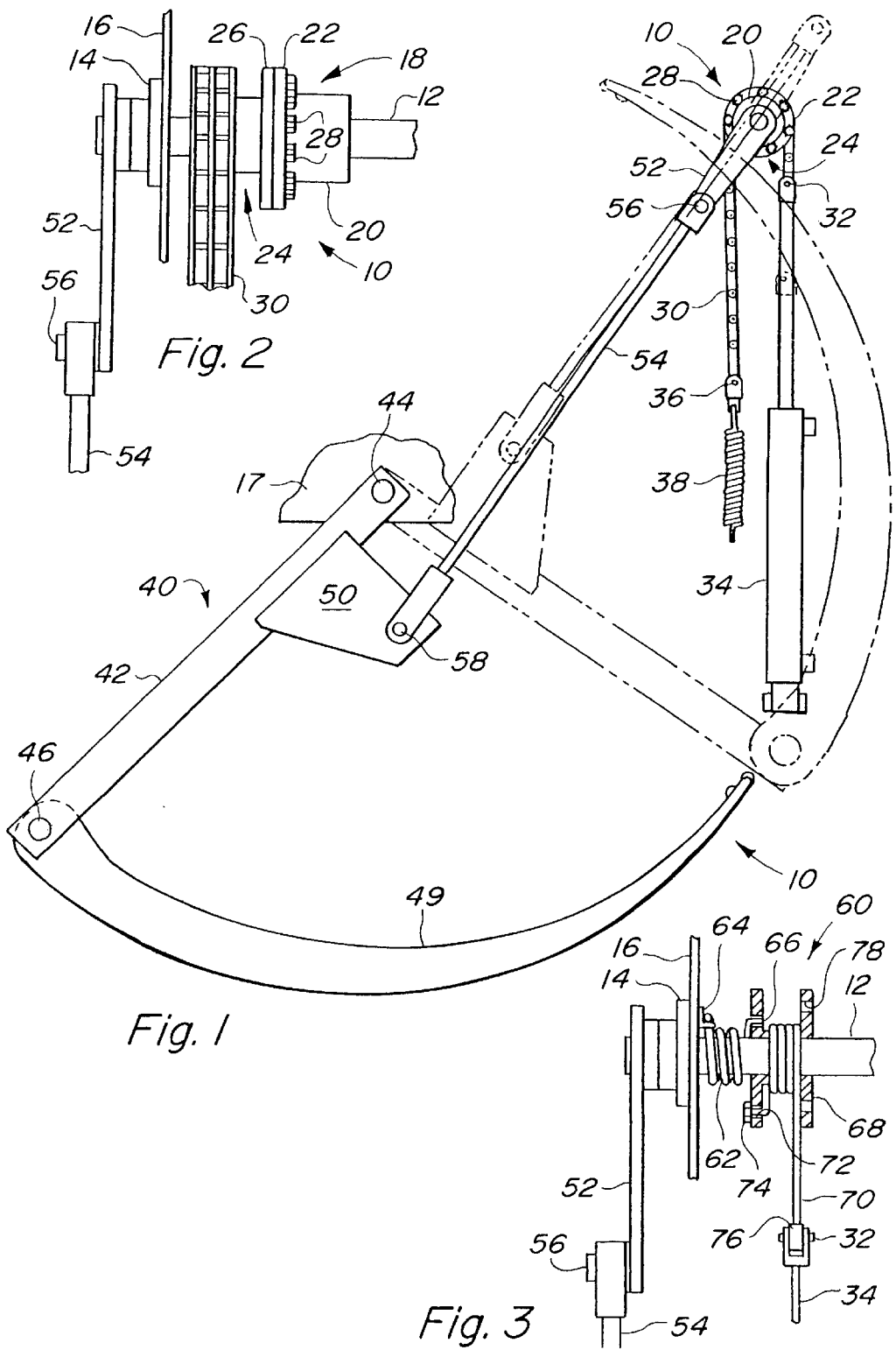
FIG. 1 is a somewhat schematic, right side view of a knotter drive constructed in accordance with the present invention and shown in solid lines in a standby position and in broken lines in a tying position.
FIG. 2 is an enlarged top plan view of the left end portion of the knotter drive shown in FIG. 1.
FIG. 3 is a top plan view of an alternate embodiment, with parts being shown in section.

Referring now to FIGS. 1 and 2, there is shown a knotter drive assembly 10 including a knotter drive shaft 12 having opposite end portions respectively mounted for rotation in respective bearing assemblies 14 mounted to vertical support plates 16 (only the left-hand bearing assembly and plate being shown) that are fixed to a bale case 17 forming part of the frame of a baler for forming rectangular bales. Not shown here are a plurality of identical knotter drive gears or knotters that are mounted on the drive shaft 12. The number of knotter drive gears is equal to the number of twine loops desired to be tied about a given bale. The tying cycle for the knotters requires the knotter drive shaft to be rotated approximately 360°.

Mounted on the knotter drive shaft 12 is a unidirectional or one-way drive clutch 18 including a hub 20 comprising an inner cylindrical member (not shown) fixed to the drive shaft and an outer cylindrical member joined to a circular mounting flange 22. Located between the inner and outer cylindrical members of the hub 20, and establishing a one-way drive connection between them, is one or more unidirectional coupling elements (not shown), as is conventional with such clutches.

Mounted for rotating freely about the knotter drive shaft 12, at a location between the plate 16 and the clutch 18 is a double drive sprocket 24 (FIG. 2) including a hub joined to a circular flange 26 that is provided with a circular pattern of threaded holes and is fixed to the mounting flange 22 of the clutch 18 by a plurality of stud bolts 28. Engaged with the teeth of the two sprockets of the double sprocket 24 is a double-row roller chain 30. One end of the chain 30 is coupled, as by a pin 32, to the rod end of an extensible and retractable hydraulic actuator or motor 34, and the other end the chain 30 is coupled, as by a pin 36 to one end of a coil tension spring 38. The motor 34 and spring 38 are both oriented so as to be in a substantially vertical, tangential relationship respectively to opposite sides of the sprocket 24, with the cylinder end of the motor 34 and an end of the spring 38 that is remote from the chain both being fixed to a side location of the bale case 17.

A twine-handling needle yoke assembly 40 includes arms 42 at its opposite sides which are each pivotally mounted, as by pins 44, to opposite sides the bale case 17 for swinging vertically about a horizontal transverse pivot axis. Ends of the arms 42, that are remote from the pins 44, are provided with holes and extending between the arms 42 is a twine needle support bar 46 having opposite ends received in the holes provided in the arms and welded in place. Mounted to the middle section of the support bar 46 is a large end of each of a plurality of tapered, curved twine needles 49, the number of the needles 49 varying with the size of the bale being formed, but in no case less than two. Each arm 42 is provided with a forwardly projecting coupling plate 50 located adjacent the pivot pin 44. As shown in solid lines in FIG. 1, the yoke assembly 40 is located in a standby position wherein the needles 49 are located beneath the bale case 17. The yoke assembly 40 is pivoted vertically to a twine tying position, as shown in broken lines, wherein the needles 49 project upwardly through respective slots provided in the bale case and respectively position a length of twine for being grabbed by an associated tying mechanism (not shown) as is conventional.

Provided for pivoting the yoke assembly 40 in a timed relationship with the tying mechanisms is a drive coupling arrangement including a crank arm 52 fixed to each of opposite ends of the knotter drive shaft 12. The drive coupling arrangement further includes a connecting rod or drive link 54 having an upper end pivotally attached to each crank arm 52 by a pin 56, and a lower end pivotally attached to the coupling plate 50, of the adjacent needle yoke assembly arm 42, by a pin 58.

The motor 34 and spring 38 are both shown in solid lines in corresponding standby positions wherein the motor 34 is substantially fully-extended and the spring 38 is substantially fully-collapsed, with no or very little stored energy. The diameter of the sprocket 24, the length of the chain 30 and the stroke of the motor 34 are so chosen that, when the motor 34 is fully retracted, the knotter drive shaft 12 will rotate approximately 360° so as to turn the knotter drive gears to effect one tying cycle. The first 180° of crank rotation results in the connecting rod 54 raising the needle yoke assembly 40 to its fully-raised, twine-delivering position, and the second 180° of crank rotation results in the needle yoke assembly returning to its standby position. At this time, the motor 34 is reset to its standby position by being actuated to extend, with the energy stored in the spring 38 during contraction of the motor 34 now acting to take up the slack in the chain 30. It is conceivable that the motor 34 could be designed as a single-acting actuator and the spring 38 used to reset the actuator to its extended standby position once the rod end of the cylinder is connected to sump by operation of a control valve, not shown. In any event, it is to be noted that the one-way clutch 18 free-wheels during extension of the motor 34 so that the knotter drive shaft 12 and the needle yoke 40 remain in place.

While the most efficient use of the chain 30 is that illustrated, it is conceivable that a longer length of chain could be used with the end that is shown connected to the spring 38 anchored to the bale case 17 and the spring 38, or alternatively a spring biased idler sprocket, being coupled to an intermediate location of the chain so as to resiliently hold a sufficient length of the chain in reserve for effecting the desired 360° rotation of the knotter drive shaft 12.

Further, while the hydraulic motor 34 is here shown such that it pulls on the drive chain 30 so as to load the spring 38 during retraction of the motor, it could of course be mounted so as to push the drive chain so as to load the spring during extension of the motor.

The alternate embodiment disclosed in FIG. 3 will now be described with parts like those described above being assigned the same reference numerals. Specifically, there is shown a knotter shaft drive arrangement 60 including a torsion recoil spring 62 received on the knotter drive shaft 12 and having a first end anchored to the support plate 16, as at a bracket 64, and a second end received in a hole 66 provided in, and thereby being anchored to an outer end member of a cable reel 68 that is rotatably mounted on the shaft 12. A flexible element in the form of a length of cable 70 has one end received through a second hole 72 provided in the outer end of the reel 68 and is anchored to the reel 68 by a nut 74 received on a threaded ferrule fixed on the one end of the cable 70. The cable 70 is wrapped about the reel 68 and secured to a second end thereof is an eye member 76 that is received in a clevis provided at the end of the piston rod of the extensible and retractable hydraulic motor 34. An inner end of the reel 68 contains a circular pattern of threaded holes 78 for receiving the bolts 28 so as to secure the one-way clutch 18 to the reel 68. The recoil spring 62 is shown in a relaxed, standby position, and the cable 70 is shown in a wrapped standby position on the reel 68. At this time the hydraulic motor 34 would be fully extended and the needle yoke assembly 40 would be in its lowered standby position.

In order to cause the yoke assembly 40 to be pivoted to its raised, twine-delivering position, shown in broken lines in FIG. 1, the motor 34 is retracted. This effects a pulling operation on the cable 70 which unwinds from the reel 68 while causing the latter to rotate clockwise, as viewed from the left end of the shaft 12 shown in FIG. 3. Rotation of the reel 68 is transferred both to the torsion spring 62, which becomes wound tighter and stores energy, and to the one-way clutch 18 which transfers the rotation to the shaft 12 so as to cause the needle yoke assembly 40 to pivot upwardly, during the first 180° of rotation, and then back to its starting position during the next 180° of rotation. The hydraulic motor 34 is then actuated to extend, with the stored energy in the torsion spring causing it to unwind and drive the reel 68 so as to take up the slack in the cable 70. The one-way clutch 18 operates such that this rotation of the reel 68 is not transferred to the shaft 12. Thus, the needle yoke assembly 40 remains in its lowered, standby position.

Other alternate embodiments where a linear output of a reversible powered device is used to cause a rotary output may be used in an assembly including a spring coupled to store energy during the linear movement of the powered device, and including a one-way clutch coupled for transferring the rotary movement to the knotter drive shaft, but turning freely when the spring unloads to return the powered device to its initial position. For example, it is conceivable that a linear motor having a follower mounted to an extensible output shaft could be used, with the follower being located in a spiral groove provided on the interior or the exterior of a cylindrical member so as to cause it to rotate during linear movement of the output shaft.

Having described the preferred embodiment, it will become apparent that various modifications can be made without departing from the scope of the invention as defined in the accompanying claims.

What is claimed is:

1. In a knotter drive arrangement including a support, and a knotter drive shaft mounted for rotation in said support, an arrangement for driving the drive shaft, comprising: a drive member mounted for free rotation about the drive shaft; a one-way clutch mounted on the drive shaft and coupled to said drive member for transferring rotation of said drive member to said drive shaft only when said drive member is rotated in a forward direction for effecting a tying operation; a reversible powered device having an output member coupled for effecting rotation of said drive member; and an energy storage device being coupled to said drive member so as to store energy in response to said output member moving in a first direction from a starting position for moving said drive member in said forward direction, and so as to release energy and move said output member back to its starting position once the latter has reached an end point of its movement during a tying cycle.

2. The knotter drive arrangement, as defined in claim 1, wherein a flexible drive element is engaged with said drive member; said output member of said powered device being retractable and extensible and being coupled to said flexible drive element for causing it to effect rotation of said drive member in said forward direction when said powered device is operated in a first direction; and said energy storage device being in the form of a spring coupled between said support and said flexible element.

3. The knotter drive arrangement, as defined in claim 2, wherein said drive member is a sprocket and said flexible drive element is a chain engaged with said sprocket.

4. The knotter drive arrangement, as defined in claim 3, wherein said output member is coupled to a first end of said chain and said energy storage device is a coil tension spring coupled directly to a second end of said chain.

5. The knotter drive arrangement, as defined in claim 3, wherein said powered device is an extensible and retractable hydraulic motor disposed along a first line that is substantially tangential to said sprocket and having a piston rod coupled directly to a first end of said chain; and said spring being a coil tension spring coupled directly to a second end of said chain and being disposed along a second line that is substantially tangential to said sprocket and parallel to said first line.

6. The knotter drive arrangement, as defined in claim 2, wherein said powered device is a hydraulic motor and said output member is a piston rod coupled directly to a first end of said flexible drive element.

7. The knotter drive arrangement, as defined in claim 1, and further including a needle yoke having arms at opposite sides thereof which are respectively pivotally mounted to said support for pivotal movement about a horizontal, transverse axis from a lowered standby position, to a raised twine-delivering position; and opposite ends of said knotter drive shaft being coupled to said needle yoke arms for effecting movement of said needle yoke between said standby and twine-delivering position and back to said standby position in response to said drive shaft being rotated for effecting a tying cycle.

8. The knotter drive arrangement, as defined in claim 1, wherein said drive member is a reel; said flexible element being wrapped on said reel and having one end coupled to said reel; said energy storage device being a coil torsion spring received on said drive shaft and having opposite ends respectively fixed to said support and to said reel.

9. In a knotter drive arrangement including a support and a knotter drive shaft rotatably mounted to said support, an arrangement for driving the knotter drive shaft, comprising: a one-way clutch mounted on said knotter drive shaft for delivering torque only for driving said drive shaft in a forward direction of rotation; a rotatable drive element mounted on said drive shaft for free rotation and being fixed to said one-way clutch; an elongate, flexible drive element being in friction engagement with said rotatable drive element for effecting rotation of the latter when moved relative thereto; a resilient, slack take-up arrangement coupled between said flexible element and said support; and a reversible motor coupled to said flexible element and operable in a first direction from an initial position for moving a predetermined length of said flexible element, in opposition to said slack take-up arrangement, across said rotatable drive element for causing it to be rotated a preselected amount in said forward direction; and said take-up arrangement being operable for restoring said flexible element to an initial condition upon said motor being returned to said initial position.

* * * * *